Dec. 8, 1964  G. W. BANKS  3,160,390
METAL CLAD SOFT SEAT VALVE CLOSURE ASSEMBLY
Filed July 28, 1961
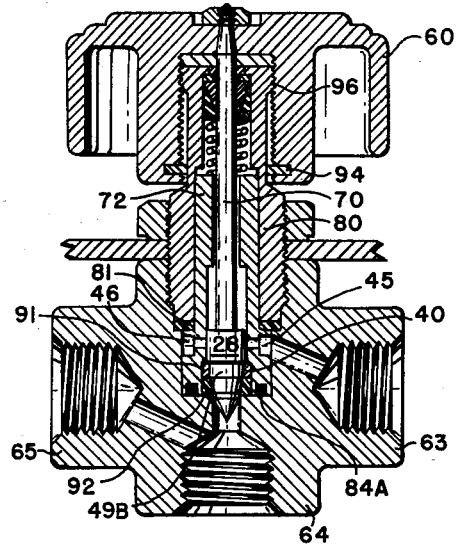
FIG__2
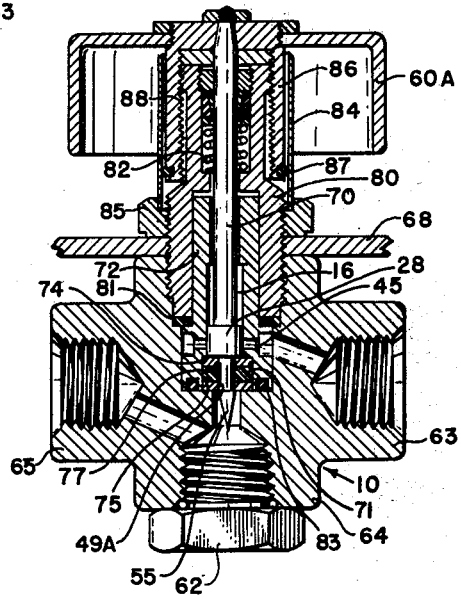
FIG__1
GEORGE W. BANKS
*INVENTOR.*
BY Clarence M. Tuck
ATTORNEY

United States Patent Office 3,160,390
Patented Dec. 8, 1964

3,160,390
METAL CLAD SOFT SEAT VALVE CLOSURE ASSEMBLY
George W. Banks, 12424 14th Ave. S., Seattle 88, Wash.
Filed July 28, 1961, Ser. No. 127,596
3 Claims. (Cl. 251—334)

This invention relates to the general field of high pressure fluid valves which are intended to operate at pressures up to and in excess of 20,000 p.s.i. Specifically, this invention relates to a metal clad soft seat assembly developed to allow plastic seats to be successfully used in valves which operate in the higher pressure ranges.

This present application is a continuation-in-part of my copending U.S. patent application Serial No. 630,694, now United States Patent 2,994,343, issued August 1, 1961.

Technological developments in many fields now require an accurate control of high pressure fluids. This is particularly true in the missile field where the required pressures are constantly increasing and this has made it necessary to re-evaluate the construction of valves as formerly employed and to provide means so that they can operate at high pressures for reasonably long times. In this present valve construction the initial closing, opening and flow metering are accomplished by an all-metal piston-type valve formed normally as part of the valve spindle or made separately and secured to or controlled by the valve spindle assembly. In this first phase of the control of high pressure fluids, continued satisfactory service is best achieved by using an all-metal piston-type valve closure member which operates on an all-metal seat. In the second phase of fluid control there is a need for minute metering as well as the further need for a positive shut-off to prevent any leakage, particularly that which might interfere seriously with test equipment. The second phase of this valve's operation therefore is best achieved by using the so-called soft-seat valve which employs a plastic ring or washer. A suitable material has been found in materials of the family of tetrafluoroethylene of which Teflon and other harder materials of the same general category are representative. This form of plastic will flow under adequate pressure yet it can be employed in presenting adequate surfaces so that over-torqueing of the valve can be prevented.

The minute metering and positive shut-off using this type of material are obtained by placing a force, as by a screw operated by a manual handle, on the entire upper surface of the soft seat which causes it to apply heavy pressure on the plastic material and this in turn causes the plastic to cold-flow and engage the metering pin, which it encircles, under high pressure for the final and positive shut-off.

It should be noted here that the entire upper and lower areas of the soft seat must be protected against erosion and this is best achieved when the seat is covered by metal in both the open and closed position. This further insures that the high working pressures can never distort the soft seat and this eliminates faulty metering and damaged soft seat arrangements. Steps must be taken, as is illustrated in this present application, for preventing damaging high velocities of fluid from striking the seats at any angle approaching a right angle. It is believed that in this present application a method and structure is provided that overcomes many of the deficiencies noted in the past and gives a long-lasting valve which will properly handle relatively large fluid flows and can, in addition, be depended upon to give accurate minute metering control with a final positive and complete shut-off.

The principal object of this present invention, therefore, is to provide a valve of quite wide range of convertibility adapting this valve for use where control of static pressures is desired and the change of pressure requires very small flows which are difficult to control.

A further object is to provide a metal-to-metal flow control means with a unitary metering pin held securely in the center of the flow orifice throughout the entire flow period. This construction insures stable, accurate metering throughout the full range of the valve capacity.

A further object of this invention is to provide a valve closure assembly which will not be damaged by over-torqueing. This desirable property is safeguarded by having substantially the entire area of the Teflon seat absorb any over-torqueing stress which the control can transmit. The area of this seat must be great enough so that the stress limit of the seat material is not approached closely enough to prevent having a relatively high factor of safety.

A further object of this invention is to provide a leak-proof shut-off which can still be depended upon for this control even though the fluid may contain small amounts of foreign material or solid particles.

A further object of this invention is to provide a valve seat of tetrafluoroethylene or similar material for the final sealing of the valve which is so enclosed in metal that it is completely protected from extrusion, or from damaging high velocities of the fluids or high differential pressures across the plastic seat which promotes very fast erosion at times.

A further object of this invention is to provide a design in which all the wearing parts are contained in the spindle barrel assembly and are quickly removed without disturbing the normal plumbing or fitting in which the valve is used.

A further object is to provide spindle barrel assemblies that are interchangeable so that they may be replaced in a moment's time and will thus provide continuity of service with a very minimum of operational shut-down.

A further object of this invention is to provide a valve housing or body that is provided with a plurality of conduit engaging bosses, one of which can be plugged with a screw-in plug to give a wide range of adaptability of the valves.

A further object of this present valve is to provide dust guard means to protect certain of the moving parts from the destructive effects of the ambient air or other conditions present in the local environment under which the valve may be caused to work.

A further object is to provide a valve that is readily adaptable to panel mounting and which may be changed quickly from a globe to an angle valve or vice versa by simply moving the screw-in plug from one of the bosses to another or when used without a plug a common feed line can be directed to two separate tanks without additional feed line piping.

A further object is to provide that the same body barrel and moving seal may use two or more sized orifices by interchanging the spindle, characterization ports and the seat assembly.

Further objects, advantages and capabilities will be apparent from the disclosure in the drawings or may be comprehended or are inherent in the device.

FIGURE 1 is an elevation in section showing a panel-mounted valve and showing also an extreme form of a metering pin together with means which insure that in an attempt to over-torque the valve the pressure on the soft seat is uniform throughout its entire area, including the central opening, which therefore gives an unusual gripping effect on the cylindrical portion of the metering pin.

FIGURE 2 is a view of a valve similar to that shown in FIGURE 1 illustrating how the mechanism may be changed where interchangeability of the valve operating parts is required for a change of service.

In the drawings, throughout which like reference characters indicate like parts, is a three boss type of convertible valve body 10.

Referring to FIGURE 1, the same three boss body 10 is employed, having the bosses 63, 64 and 65, all internally threaded to accept suitable fluid supply conduits. In FIGURE 1 however the plug 62 is employed in boss 64 so as to show the globe valve assembly of this valve. Valve spindle 70 is of a modified construction but still employs the cylindrical valve closure member 28 and the tapered metering portion 55. The cylindrical sealing portion 49A is extended in length so as to permit a modified form of the metal clad soft seat valve assembly. The soft seat or plastic sealing means is indicated at 71 as a conventional washer of plastic material of the type noted, except that for high pressures a harder temper of this material is desirable. This washer is enclosed within the walls of the counterbore formed within the secondary spindle barrel 72. Disposed above and below the Teflon washer are preferably steel washers 74 and 75. These washers and the wall 77 of the secondary spindle barrel 72 and the cylindrical portion 49a of the spindle form a complete metal enclosure for the plastic washer 71 when the valve is closed. It is believed apparent that when spindle 70 is moved downwardly by the modified handle 60a and the threads 88 which coact to this end, relatively high initial compression pressure can be placed on the plastic washer 71. This normally is sufficient to cause the Teflon washer to flow out into intimate contact with cylindrical portion 49A and effect a fluid seal. When, however, high pressures are involved, and these valves can handle pressures in the range of 12,000 p.s.i. or higher, it has been found that any tendency for the high pressures to pass through the seal effected by washer 71 causes sufficient pressure build up to cause a decided flow of the Teflon and insure that it will grip the walls 77 and the surface of the cylindrical portion 49A so closely as to prevent any leakage at this point.

The valve spindle barrel 80 is threadedly secured to body 10 and sealed at its lower extremity by the preferably Teflon flat ring washer 81. The seal 87 along the valve spindle 70 is of a type more fully illustrated in my copending U.S. patent application Serial No. 630,694, now United States Patent 2,994,343, issued August 1, 1961. It is to be noted that the secondary spindle barrel 72 is sealed at its lowermost end by the O-ring sealing means shown at 83.

In FIGURE 1, means have been employed to protect the spindle moving threads 88 from abrasives, dust and the like. This shielding consists of a tubular shield arrangement 84 which is secured to the assembly nut 85 and is spaced somewhat from the threaded hub 86 of handle 60A and between these two is provided a dirt guard ring 87. The reciprocating movement of valve spindle 70 is obtained by the coaction of threads 88 disposed on the spindle barrel 80 and handle 60A.

Referring to FIGURE 2 there is shown a valve in which many of the parts are identical with the valve of FIGURE 1 so that the valve spindle barrel assembly can be removed and the assemblies interchanged between the two valves or a new assembly of the same type may thus replace a damaged one. This is an important economy in that this type of valve for high pressures is an expensive construction and the tolerances required far exceed those ever employed before in valve construction. It therefore is very practical to have a valve with elements that can be made up in advance and assembled to meet a given need.

The principal difference in the showing of FIGURE 2 over FIGURE 1 is the actual valve closure means. In this particular version the spindle and the cylindrical valve closure member 28 are identical and the same is true for the characterization ports 45 and the annular fluid distributing chamber 46. However, the cylindrical sealing portion 49B is longer and on a larger diameter and the sealing here is effected by a Teflon ring sealing member 92 which is positioned by an overhanging ledge 40 formed as part of the secondary spindle barrel 72. The upper support for the Teflon ring 92 is the metal ring 91. In this arrangement, as before, the Teflon sealing member 92 is fully enclosed in metal when the valve is closed and the main flow is opened or closed by the cylindrical valve closure member 28. Consequently, the Teflon ring 92 has the prime purpose of handling small quantities of fluid under precise metering conditions and to insure a complete closure when the valve is closed. Pressure for this closure is supplied initially by the downward travel of closure member 28 augmented by fluid pressure which will compress the Teflon and force it out in both directions transversely, as viewed, to seal the inner wall of the secondary spindle barrel and the outer surface of the cylindrical sealing portion 49B of the spindle assembly.

This valve is optionally convertible to either globe or angle valve and further has a dust packing means at 94 to protect the threads 96 from the ingress of contaminants and abrasives. Handle 60B is of a slightly modified form, the constructional details of which are believed apparent from FIGURE 2. The packing means to prevent the flow of fluid along the stem 70 is the same as shown in FIGURE 1 and relates back to my copending U.S. Patent application Serial No. 630,694, now U.S. Patent 2,994,343, issued August 1, 1961. The valve spindle barrel 80 is sealed by a Teflon ring 81 as in FIGURE 1 and the secondary spindle barrel is sealed in this instance by a similar O-ring 84A.

In the closing cycle, the flow is first cut off by an all-metal piston-type valve. At this point in the closing cycle it should be noted that the soft seat is still not in contact with the moving spindle so there is no differential pressure across it. At this point in the cycle where contact is made, the soft seat completely fills its metal confinement which is close fitting enough to avoid any extrusion.

It is believed that it will be apparent from the above description and the disclosure in the drawings that the invention comprehends a novel construction of a high pressure fluid valve having a metal clad soft seat valve closure assembly.

Having thus described my invention, I claim:

1. A high pressure metering valve for fluids comprising a valve body formed with a cylindrical spindle opening including a lower cylindrical end terminating in a bottom, a first passageway for fluid coaxial with said spindle opening and communicating with said bottom, a second passageway for fluid communicating with said lower end of said spindle opening above the bottom thereof, a valve disc having a circular bore defining an interior surface in said disc, said disc being composed of cold flowing plastic and said disc being positioned within said lower end of said spindle opening, metal enclosing means for said plastic valve disc engaging the entire exterior surface thereof, a primary spindle barrel secured within said spindle opening and having its lower end terminating above said second passageway, a secondary spindle barrel positioned within said primary spindle barrel and extending below the lower end thereof, said secondary spindle barrel having a lower cylindrical portion fitted within the lower end of said spindle opening, said lower cylindrical portion being formed with ports positioned above the lower end of said secondary spindle barrel, said ports communicating between the interior of said secondary spindle barrel and said second passageway for fluid, and a valve stem longitudinally movable within said spindle barrels and having a piston valve portion and a tapered metering point, said tapered metering point being adapted to sealingly engage the interior surface of said valve disc, said piston valve portion of said valve stem obstructing said ports to permit slow metered passage of fluid through said valve while said ports are obstructed and said ports being positioned sufficiently above the lower end of said secondary spindle barrel so that said metering point is well away from the cold flowing plastic of said valve disc before said piston valve portion is moved sufficiently to start opening said ports.

2. A valve as recited in claim 1 in which said valve disc is fitted within an annular recess in the lower end of said secondary spindle barrel.

3. A valve as recited in claim 1 in which said ports are spaced around the periphery of said secondary spindle barrel, said ports communicating fluid from the interior of said secondary spindle barrel to said second passageway by means of an annular fluid distributing chamber formed between said ports and said lower cylindrical end of said spindle opening.

References Cited in the file of this patent

UNITED STATES PATENTS

| | | |
|---|---|---|
| 2,457,492 | Raybould | Dec. 28, 1948 |
| 2,485,092 | Gannon | Oct. 18, 1949 |
| 2,791,238 | Bryant | May 7, 1957 |
| 2,885,176 | Bryant | May 5, 1959 |
| 2,895,495 | Bryant | July 21, 1959 |
| 2,985,424 | Anderson | May 23, 1961 |
| 2,995,057 | Nenzell | Aug. 8, 1961 |